US006826787B2

(12) United States Patent
Gregory

(10) Patent No.: US 6,826,787 B2
(45) Date of Patent: Dec. 7, 2004

(54) CONTROLLER

(75) Inventor: Vincent Gregory, Queensland (AU)

(73) Assignee: Pac Venture, LLC., Queensland (AU)

( * ) Notice: Subject to any disclaimer, the term of this patent is extended or adjusted under 35 U.S.C. 154(b) by 0 days.

(21) Appl. No.: 10/450,760

(22) PCT Filed: Dec. 7, 2001

(86) PCT No.: PCT/AU01/01598

§ 371 (c)(1),
(2), (4) Date: Jun. 12, 2003

(87) PCT Pub. No.: WO02/48483

PCT Pub. Date: Jun. 20, 2002

(65) Prior Publication Data

US 2004/0025240 A1 Feb. 12, 2004

(30) Foreign Application Priority Data

| Dec. 12, 2000 | (AU) | ............... PR2055 |
|---|---|---|
| May 21, 2001 | (AU) | ............... PR5135 |

(51) Int. Cl.⁷ ............................................. E04H 4/00
(52) U.S. Cl. ......................................................... 4/508
(58) Field of Search ............................. 4/508; 137/393, 137/409

(56) References Cited

U.S. PATENT DOCUMENTS

| 3,908,206 | A | | 9/1975 | Grewing | 4/172 |
|---|---|---|---|---|---|
| 4,342,125 | A | | 8/1982 | Hodge | 4/508 |
| 4,524,798 | A | | 6/1985 | Simard | 137/448 |
| 4,655,243 | A | * | 4/1987 | Keller | 137/403 |
| 4,853,986 | A | | 8/1989 | Allen | 4/508 |
| 5,203,038 | A | | 4/1993 | Gibbs | 4/508 |
| 5,596,773 | A | | 1/1997 | Cueman | 4/508 |
| 5,655,232 | A | | 8/1997 | Buckwalter | 4/508 |
| 5,836,022 | A | | 11/1998 | Busenga | 4/508 |

FOREIGN PATENT DOCUMENTS

| AU | 4439897 | 5/1998 | |
|---|---|---|---|
| GB | 2280732 | 10/1993 | ........... F16K/21/18 |
| GB | 2302162 | 1/1997 | ............ E04H/4/12 |
| ZA | 8701831 | 9/1987 | |
| ZA | 8709750 | 6/1988 | |

* cited by examiner

Primary Examiner—Charles E. Phillips
(74) Attorney, Agent, or Firm—Abelman, Frayne & Schwab

(57) ABSTRACT

A portable controller (110) for controlling the level of water in a swimming pool, including: a container (111) adapted to rest in a predetermined position adjacent the pool in which the water level is to be controlled, said container having a base (112) and one or more side walls (113, 114, 116, 117) extending upwardly from said base, an inlet in one of said one or more side walls for receiving water into the container and an outlet in or over at least one of said one or more side walls above said base for discharging water into the pool, said base and said one or more side walls at least in part defining a water storage chamber (124) below said outlet sized to weight said container to retain it in a predetermined position adjacent the pool when said chamber is full of water; an on/off valve (122) in fluid communication with said inlet for controlling flow of water into said container; and a float (132) operatively connected to said on/off valve and adapted to float in the pool when said container is in the predetermined position for controlling the operation of the valve in response to the level of water in the pool.

10 Claims, 6 Drawing Sheets

CONTROLLER

TECHNICAL FIELD OF THE INVENTION

This invention relates to a controller. The invention has particular application to controlling the level of water in swimming pools and for the purpose of illustration reference will be made to such application. However, it is to be understood that the invention is not limited to use with water nor with swimming pools and could have application to other liquids and other types of reservoirs.

BACKGROUND ART

It will be appreciated that the water level in swimming pools falls as a result of evaporation, splashing, and leakage and consequently they need replenishing from time to time. Typically, pool owners replenish the pools via a hose connected to the water main with the free end dropped directly into the pool. With this approach a watch must be kept on the water level or the pool can be overfilled, thereby wasting water and pool chemicals and causing pollution of waterways.

One controller which attempts to overcome this problem is illustrated in U.S. Pat. No. 5,203,038 to Gibbs. The controller described in the Gibbs patent has a metal plate which rests on the pool surround with a float valve secured to the plate and connected to the water main by a hose, the float being arranged to float on the surface of the pool and to shut off the flow of water into the pool as the level reaches a predetermined set height. The Gibbs controller requires the use of relatively heavy material for construction and appears not to be as stable as desired to ensure that the float valve operates effectively. Additionally, the arrangement is such that metal components are positioned above the pool and are therefore subject to the corrosive effects of chlorine evaporating from the pool. Moreover, it appears to be undesirably dangerous for persons using the pool particularly children while in operation.

Another controller which attempts to overcome the aforementioned problem is illustrated in GB Patent Application No. 2302162 by Johnson.

The Johnson controller has a float valve which is supported in a cage which hangs over the edge of a pool from a support base resting on the pool surround, the float valve being connected to the water mains by a hose. The support base is weighted by a heavy portable block to maintain the cage in place.

Similarly, U.S. Pat. No. 5,836,022 to Busenga relies on ballast to secure a float valve in a desired position. The Busenga controller has a float valve which is secured to a fully enclosed container of ballast and connected to the water mains by a hose, the float being arranged to float on the surface of the pool and to shut off the flow of water into the pool as the level reaches a predetermined set height as with the Gibbs controller. One of the disadvantages of the Busenga controller is that it is undesirably heavy for transfer to and from a pool to a storage shed. Additionally, the fully enclosed container is made up of pipework and pipe fittings and thus is undesirably expensive.

Other controllers which are designed for maintaining the level of water in a swimming pool typically require a float valve to be mounted permanently or semi-permanently in the pool and thus are dangerous for swimmers.

The present invention is aimed at providing a portable controller which ameliorates the aforementioned problems or at least provides an attractive and useful alternative.

DISCLOSURE OF THE INVENTION

With the foregoing in view the present invention resides broadly in a portable controller for controlling the level of water in a swimming pool, including:

a container having a base and one or more side walls extending upwardly from said base and an outlet in or over at least one of said one or more side walls above said base for discharging water into the pool the level of which is to be controlled, said base and said one or more side walls at least in part defining a water storage chamber below said outlet sized to weight said water container so as to retain it in a predetermined position adjacent the pool when said chamber is full of water;

an on/off valve operatively mounted to said container for controlling flow of water into said water storage chamber, and a float operatively connected to said on/off valve and adapted to float in the pool when said container is in the predetermined position for controlling the operation of the valve in response to the level of water in the pool.

In another aspect the invention resides broadly in a portable controller for controlling the level of water in a swimming pool, including:

a container adapted to rest in a predetermined position adjacent the pool in which the water level is to be controlled, said container having a base and one or more side walls extending upwardly from said base, an inlet in one of said one or more side walls for receiving water into the container and an outlet in or over at least one of said one or more side walls above said base for discharging water into the pool, said base and said one or more side walls at least in part defining a water storage chamber below said outlet sized to weight said container to retain it in a predetermined position adjacent the pool when said chamber is full of water;

an on/off valve in fluid communication with said inlet for controlling flow of water into said container, and a float operatively connected to said on/off valve and adapted to float in the pool when said container is in the predetermined position for controlling the operation of the valve in response to the level of water in the pool.

Preferably, the container is so made and arranged that the water storage chamber may rest wholly or at least substantially on the pool surround when the controller is in the predetermined position controlling the level of water in the pool. Advantageously, such arrangement maximises the resistance of the weight of the water therein to the buoyancy forces on the float.

Preferably, a portion of said one or more side walls forms a weir over which water flowing into said storage chamber may flow to a discharge chute for discharge into the pool, said wall portion separating said water storage chamber from said discharge chute. It is also preferred that the remainder of said one or more side walls be contiguous and form a cover over said water storage chamber and said discharge chute with said valve being enclosed beneath said cover. Advantageously, in such form, the controller can be positioned with the weir adjacent the edge of the pool to be filled and the full weight of the water in the storage chamber is available to resist the buoyancy forces on the float. In such form it is also preferred that the float be arranged to operate as close as possible to the weir in order to decrease the lifting moment on the container from the float.

In another aspect, the invention resides broadly in a portable controller for controlling the level of liquid in a reservoir, including:

a container having a base and one or more side walls extending upwardly from said base and an outlet in one of said one or more side walls above said base for discharging liquid into the reservoir, said base and said one or more side walls at least in part defining a liquid storage chamber below said outlet sized to weight said water container so as to retain it in a predetermined position adjacent the reservoir when said chamber is full of liquid;

an on/off valve operatively mounted to said container for controlling flow of liquid into said liquid storage chamber, and a float operatively connected to said on/off valve and adapted to float in the reservoir when said container is in the predetermined position for controlling the operation of the valve in response to the level of liquid in the reservoir.

In another aspect the invention resides broadly in a method of controlling the level of water in a swimming pool, including:

providing a portable controller including a container having a base and one or more side walls extending upwardly from said base and an outlet in one of said one or more side walls above said base, said base and said one or more side walls at least in part defining a water storage chamber below said outlet sized to weight said water container so as to retain it in a predetermined position adjacent the pool when said chamber is full of water, said controller having an on/off valve operatively mounted to said container for controlling flow of water into said water storage chamber, and a float operatively connected to said on/off valve and adapted to float in the pool when said container is in the predetermined position for controlling the operation of the valve in response to the level of water in the pool;

connecting a hose to said on/off valve, filling said water storage chamber and placing said controller in a predetermined location adjacent the pool with said outlet above the pool and said float in a position whereby it may move said on/off valve to the off position upon the water in the pool reaching a predetermined level.

In another aspect the present invention resides broadly in apparatus for controlling the level of liquid in a reservoir, including a container having an inlet adapted to be connected to a liquid supply conduit, an outlet adapted for discharge of liquid to the reservoir in which the level is to be controlled, a valve in fluid communication with said inlet for controlling flow of liquid through the inlet and a float for controlling the valve in response to the level of liquid in the reservoir.

BRIEF DESCRIPTION OF THE DRAWINGS

In order that this invention may be clearly understood and put into practical effect, reference will now be made to the accompanying drawings wherein:—

DETAILED DESCRIPTION OF THE DRAWINGS

Figure 1:
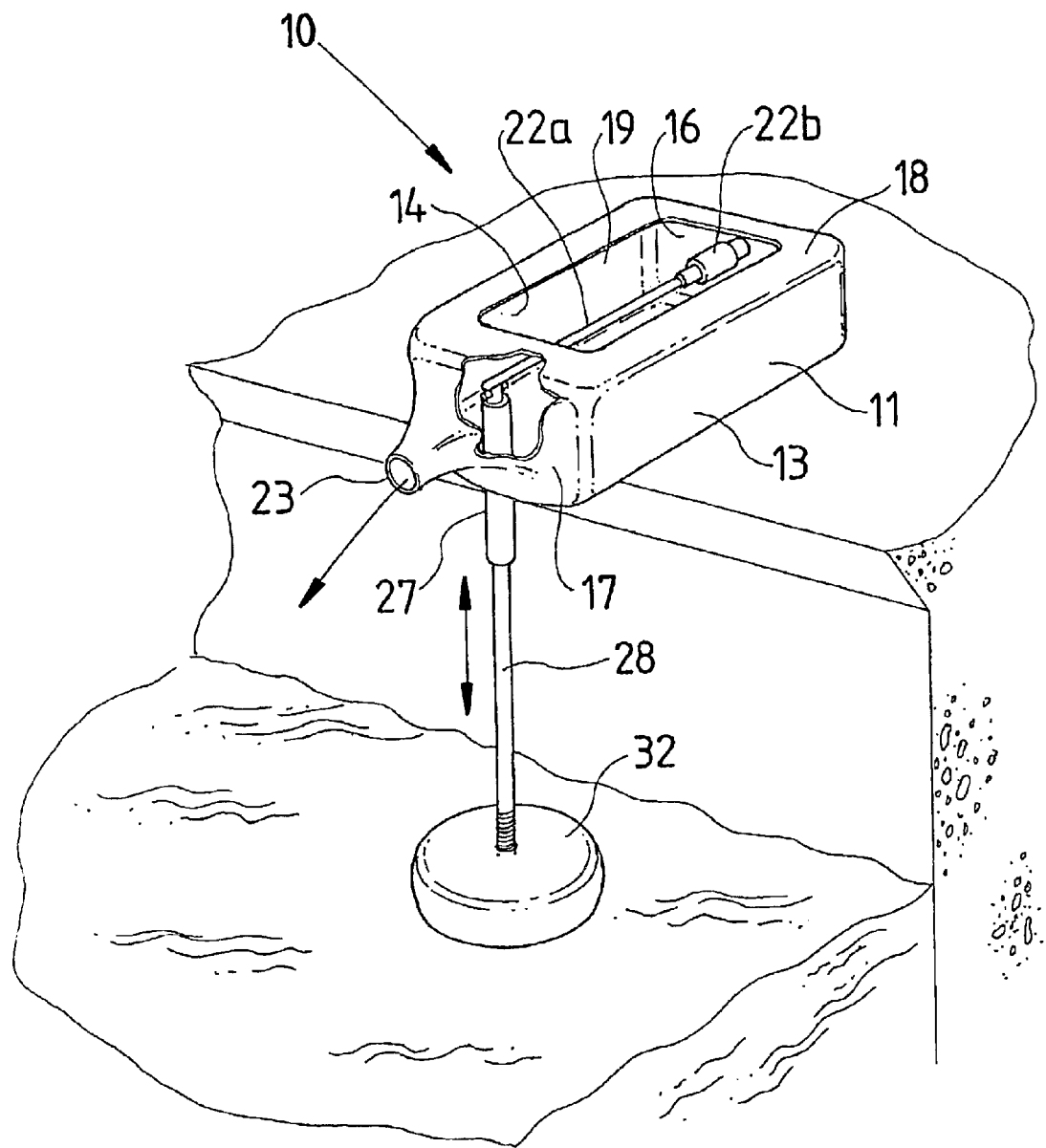
FIG. 1 is a pictorial representation of a controller according to the present invention in use controlling the water level in a swimming pool.
Figure 2:
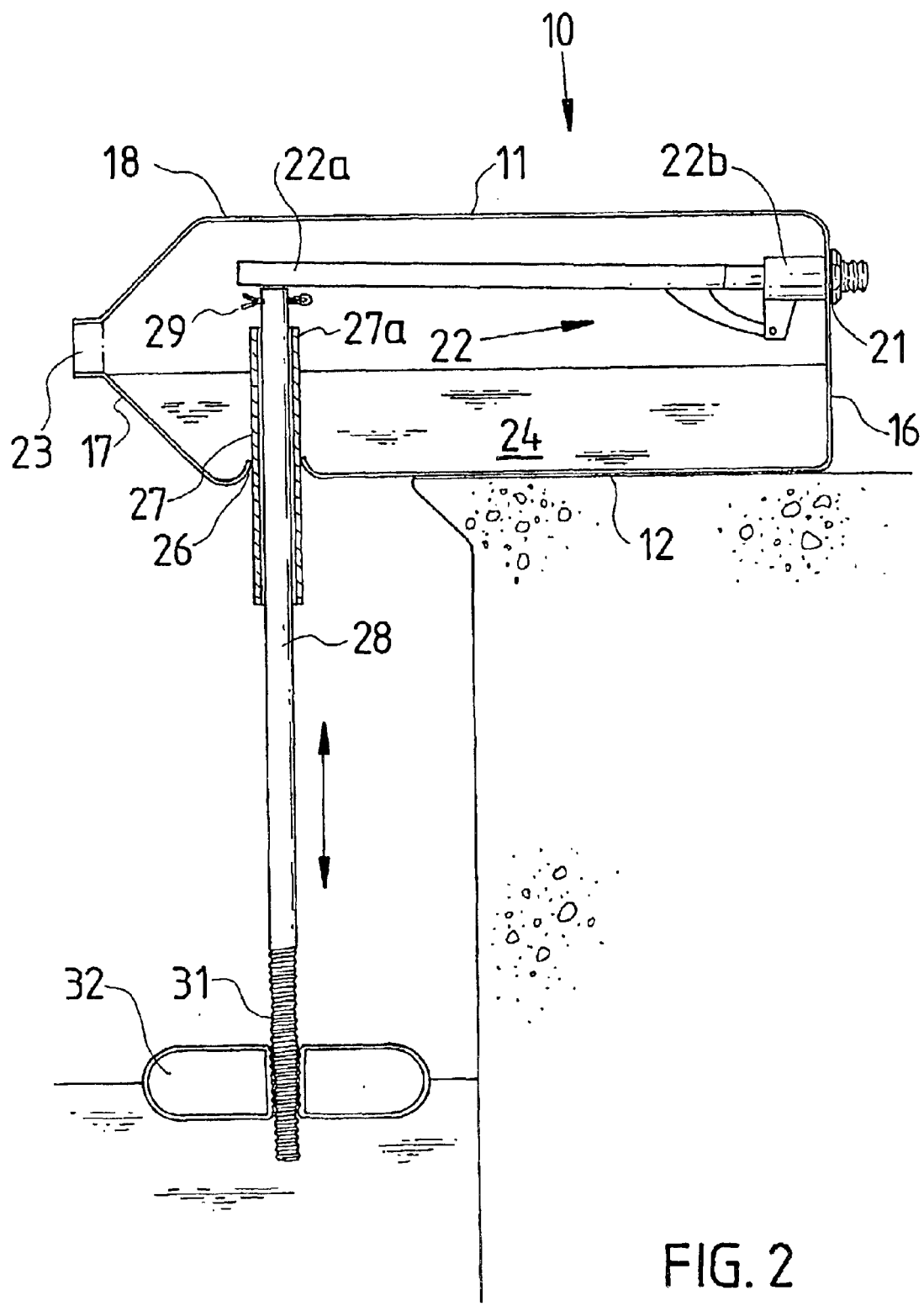
FIG. 2 is a sectional side elevation of the controller of FIG. 1 in the same position as in FIG. 1.

The controller 10 illustrated in FIG. 1 includes a container 11 having a base 12, opposed side walls 13 and 14, opposed end walls 16 and 17 and a top wall 18 having a large opening 19 therein.

An inlet opening 21 is provided in the end wall 16 and an outlet opening 23 is provided approximately halfway up the opposite end wall 17. It will be seen that the base, side walls and end walls in part define a water storage chamber 24 below the outlet 23. A float valve assembly 22 of known type is mounted in the inlet opening, the float valve assembly having a float arm 22a extending towards the outlet opening and adapted to move up and down to close and open the valve the body of which can be seen as item 22b. It will also be seen that the base, side walls, and top wall are contiguous and substantially encapsulate the float valve assembly.

An aperture 26 is provided in the base near end wall 17 and a tube 27 is secured in the aperture and sealed to the base to prevent egress of water. The tube extends upwardly to terminate at a free end 27a above the outlet 23 while a rod 28 extends through the tube and is connected to the float arm by a split pin 29. At its lower end, the rod has a threaded portion 31 to which a float 32 is mounted, the position of which can be adjusted by screwing along the thread.

In use, the controller 10 is placed beside a pool to be filled with the base 12 on the pool surround and the outlet 23 above the water so that inflowing water can be discharged into the pool. The height of the float 32 is adjusted so that the valve closes when the water level in the pool reaches a predetermined desired height. It will be seen that upward movement of the rod 28 by the float causes corresponding upward movement of the free end of the float arm which closes the valve in known manner. Advantageously, the weight of the water in the storage chamber 24 is sufficient to provide a reaction force against the buoyancy force on the float so as to retain the controller in the desired position on the pool surround. It will be appreciated that water in the water storage chamber can be emptied into the pool upon completion of filling so that the controller is a relatively lightweight unit when empty and can be easily stored.

Figure 3:
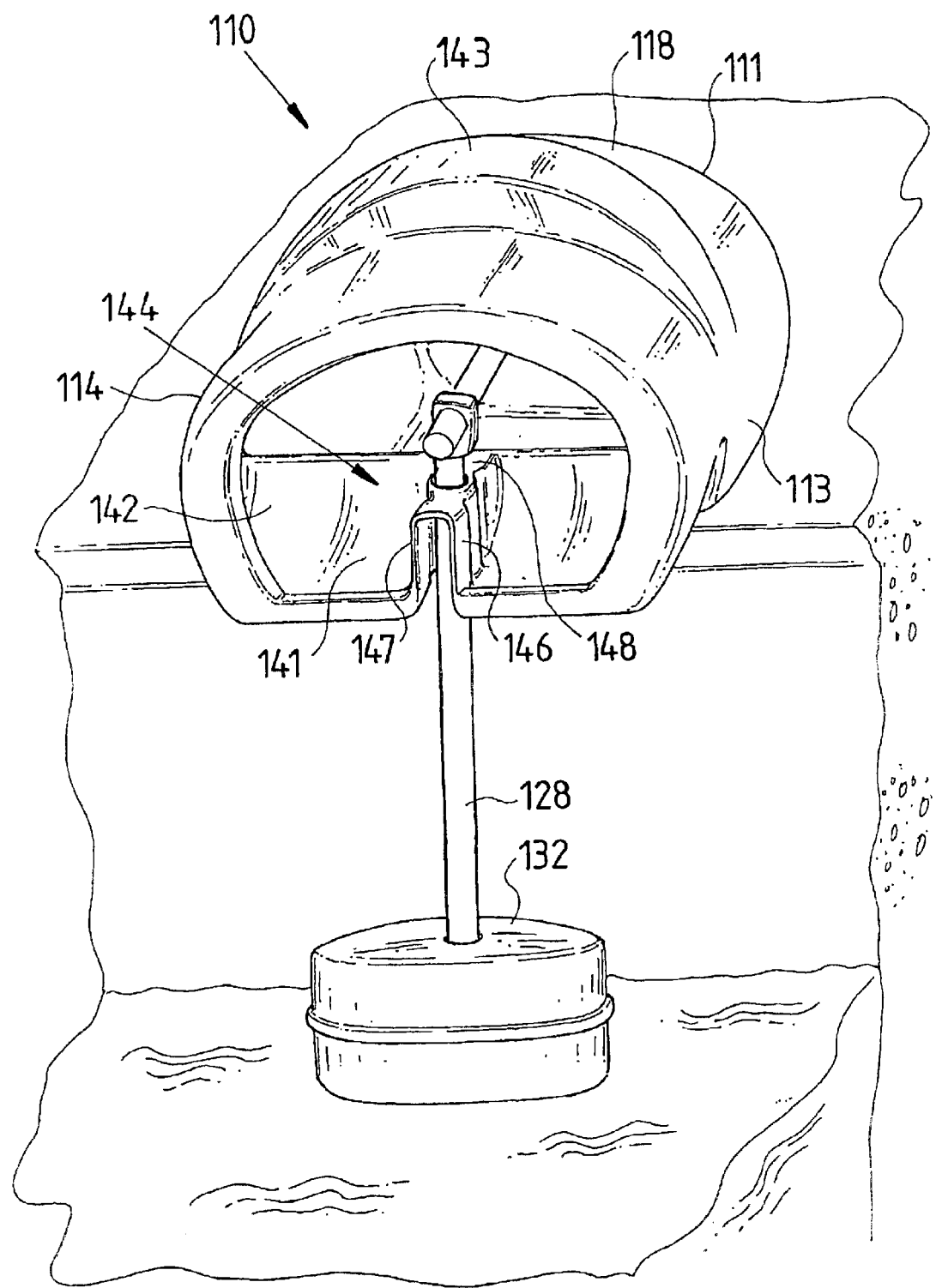
FIG. 3 is a pictorial representation of another controller according to the invention in use controlling the water level in a swimming pool.

The controller 110 illustrated in FIG. 3 is similar to that of FIG. 1 in many respects and where possible corresponding numbers have been used to reference corresponding parts but prefaced by a "1". The controller includes a container 111 having a base wall 112, opposed side walls 113 and 114, opposed end walls 116 and 117 and a top wall 118 contiguous with the side walls and end wall 116. The side walls and end walls form a water storage chamber 124 as in the controller of FIG. 1, but end wall 117 also forms a weir over which water may flow from the water storage chamber to a chute 141 from which it can flow through the open end 142 defined by the free ends of the contiguous side walls, top wall and the chute. In this respect, it will be seen that the top wall extends over and beyond the weir and the chute as well as the side walls extend beyond the weir to define the open end 142. Additionally, a handle portion 143 is formed midway along the top wall to provide for easy carrying of the controller between a storage shed and the swimming pool. The container 111 is formed of a plastics material by a blow-moulding process and the open end 142 is initially closed by a wall portion. That portion is removed after blow moulding to create the open end 142. Advantageously, by using a blow moulding technique, the container can be produced at very low cost.

Figure 4:
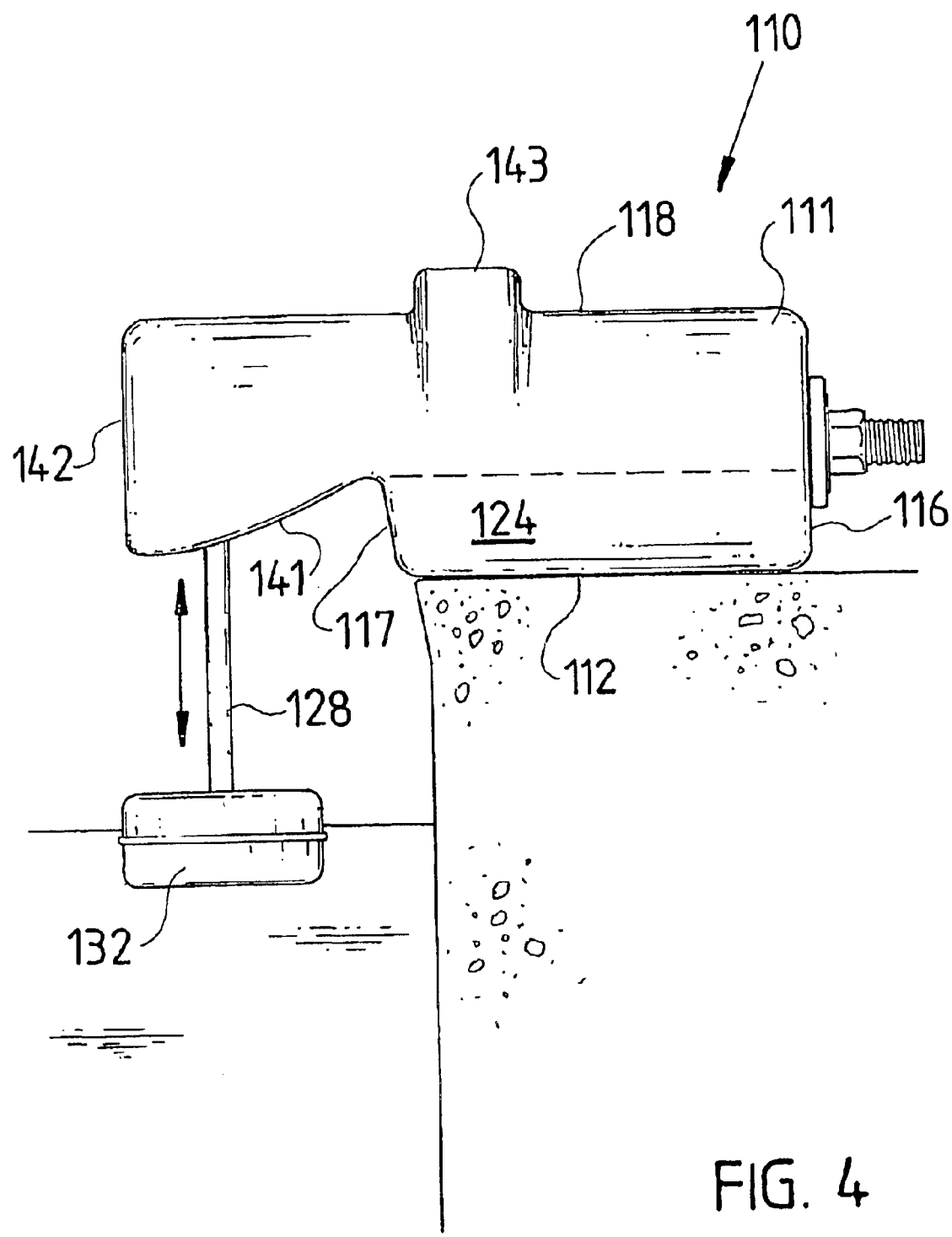
FIG. 4 is a sectional side elevation of the controller of FIG. 3 in the same position as in FIG. 3.
Figure 5:
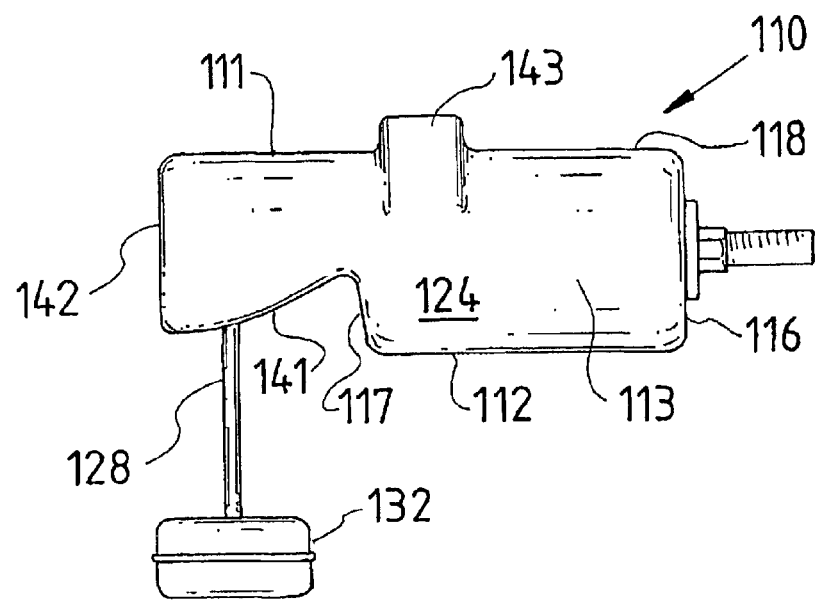
FIG. 5 is a side elevation of the controller of FIG. 3.
Figure 6:
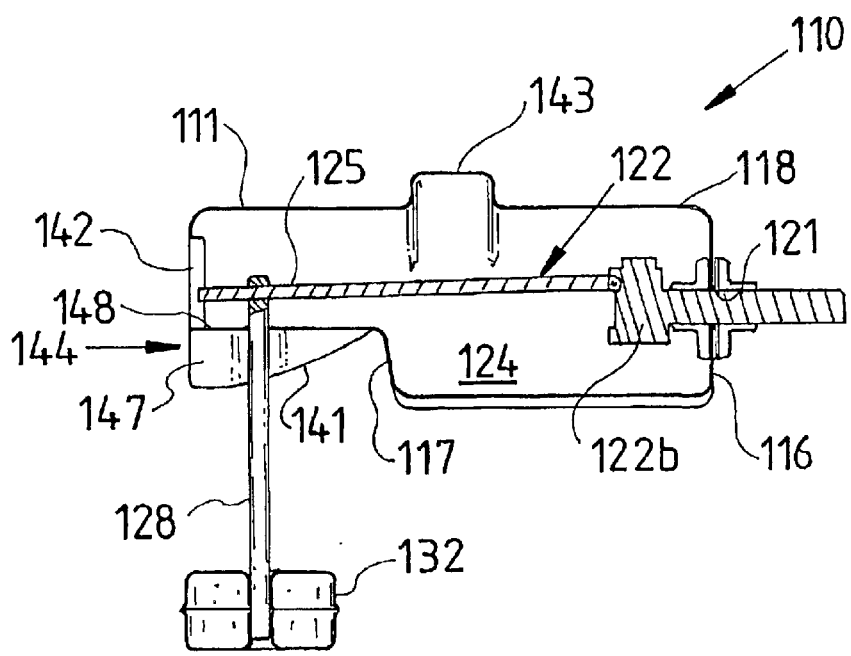
FIG. 6 is a sectional side elevation of the controller of FIG. 3.
Figure 7:
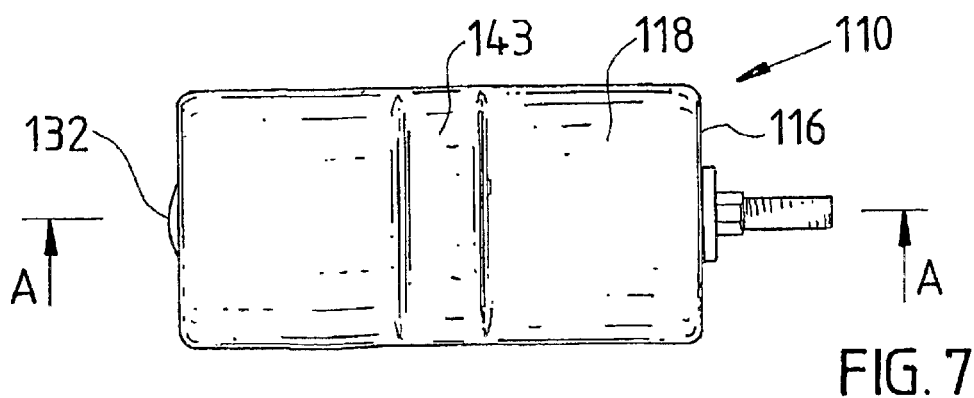
FIG. 7 is a plan view of the controller of FIG. 3.
Figure 8:
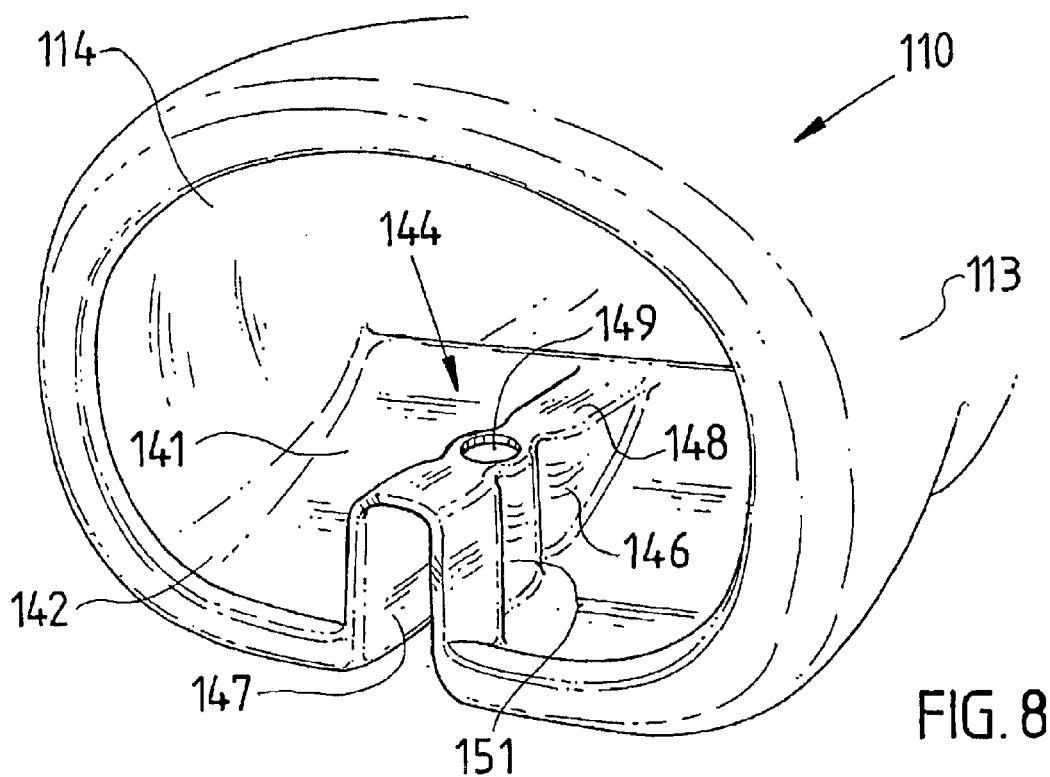
FIG. 8 is a pictorial view of the open end of the controller of FIG. 3.
Figure 9:
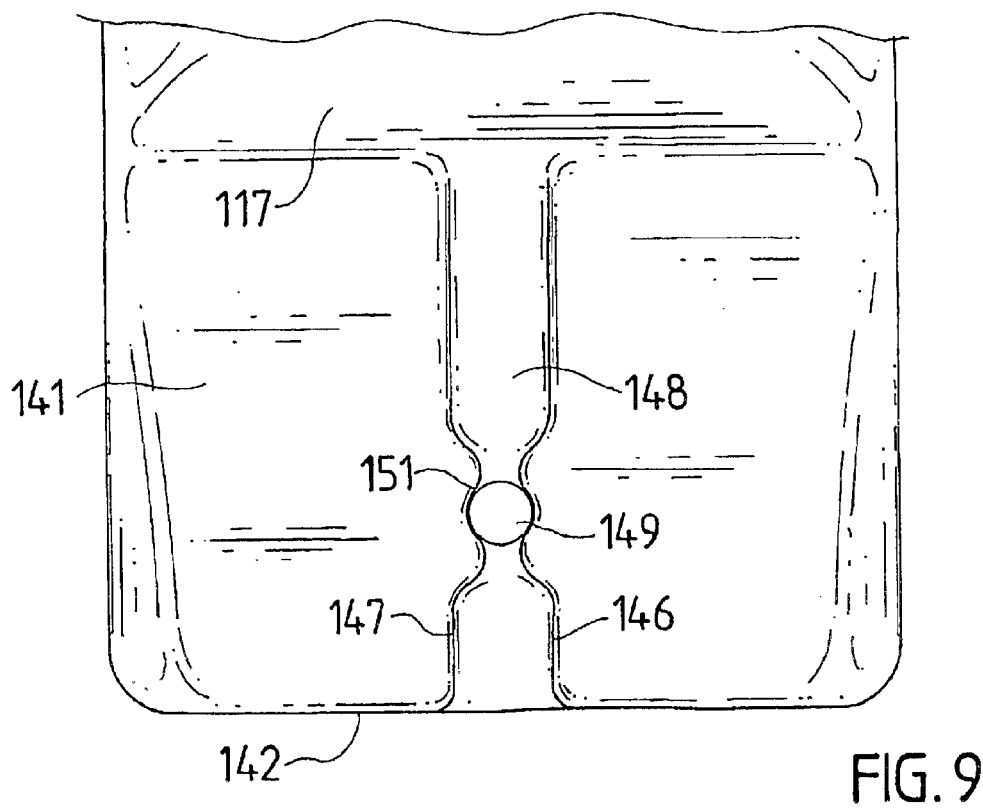
FIG. 9 is an underside plan view of the chute portion of the controller of FIG. 3.

The valve assembly 122 is mounted in an aperture 121 provided in end wall 116 in the same manner as the controller of FIG. 1. However, as can be more clearly seen in FIG. 3, a bridge portion 144 is formed in the chute portion, the bridge portion having opposed side wall portions 146 and 147 and a top wall portion 148 at the same height as the weir. An aperture 149 is provided in the top wall and the side walls are moulded to form a part cylindrical guide 151 for the rod 128 as can be more clearly seen in FIGS. 8 and 9, the rod being secured to the float arm 125 by a plastic side opening clip. A float 132 is adjustably secured to the rod in a similar manner to that of FIG. 1. As can be more clearly seen in FIG. 4, the water storage chamber 124 is almost completely supported on the pool surround such that the controller takes the full advantage of the weight of the water therein to oppose the buoyancy forces on the float. Additionally, the container 111 is arranged such that it can be blow moulded in one piece thereby being relatively inexpensive to manufacture.

The foregoing description has been given by way of illustrative example of the invention, and many modifications and variations which will be apparent to persons skilled in the art may be made without departing from the spirit and scope of the invention as defined in the appended claims.

What is claimed is:

1. A portable controller for controlling the level of water in a swimming pool, including:
   a container having a base and one or more side walls extending upwardly from said base and an outlet in or over at least one of said one or more side walls above said base for discharging water into the pool, said base and said one or more side walls at least in part defining a water storage chamber below said outlet sized to weight said water container so as to retain it in a predetermined position adjacent the pool when said chamber is full of water;
   an on/off valve operatively mounted to said container for controlling flow of water into said water storage chamber, and
   a float operatively connected to said on/off valve and adapted to float in the pool when said container is in the predetermined position for controlling the operation of the valve in response to the level of water in the pool.

2. A portable controller for controlling the level of water in a swimming pool, including:
   a container adapted to rest in a predetermined position adjacent the pool in which the water level is to be controlled, said container having a base and one or more side walls extending upwardly from said base, an inlet in one of said one or more side walls for receiving water into the container and an outlet in or over at least one of said one or more side walls above said base for discharging water into the pool, said base and said one or more side walls at least in part defining a water storage chamber below said outlet sized to weight said container to retain it in a predetermined position adjacent the pool when said chamber is full of water;
   an on/off valve in fluid communication with said inlet for controlling flow of water into said container, and
   a float operatively connected to said on/off valve and adapted to float in the pool when said container is in the predetermined position for controlling the operation of the valve in response to the level of water in the pool.

3. A portable controller for controlling the level of liquid in a reservoir, including:
   a container having a base and one or more side walls extending upwardly from said base and an outlet in one of said one or more side walls above said base for discharging liquid into the reservoir, said base and said one or more side walls at least in part defining a liquid storage chamber below said outlet sized to weight said water container so as to retain it in a predetermined position adjacent the reservoir when said chamber is full of liquid;
   an on/off valve operatively mounted to said container for controlling flow of liquid into said liquid storage chamber, and
   a float operatively connected to said on/off valve and adapted to float in the reservoir when said container is in the predetermined position for controlling the operation of the valve in response to the level of liquid in the reservoir.

4. A portable controller according to claim 1, wherein a portion of said one or more side walls forms a weir over which water flowing into said storage chamber may flow to a discharge chute for discharge into the pool, said wall portion separating said water storage chamber from said discharge chute.

5. A portable controller according to claim 4, wherein the others of said one or more side walls are contiguous and form a cover over said water storage chamber and said discharge chute with said valve being enclosed beneath said cover.

6. A portable controller according to claim 4, wherein said container is so made and arranged that the water storage chamber may rest wholly or at least substantially on the pool surround when the controller is in the predetermined position controlling the level of water in the pool.

7. A portable controller according to claim 1 wherein said container is a blow moulded container.

8. A method of controlling the level of water in a swimming pool, including:
   providing a portable controller including a container having a base and one or more side walls extending upwardly from said base and an outlet in one of said one or more side walls above said base, said base and said one or more side walls at least in part defining a water storage chamber below said outlet sized to weight said water container so as to retain it in a predetermined position adjacent the pool when said chamber is full of water, said controller having an on/off valve operatively mounted to said container for controlling flow of water into said water storage chamber, and a float operatively connected to said on/off valve and adapted to float in the pool when said container is in the predetermined position for controlling the operation of the valve in response to the level of water in the pool;
   connecting a hose to said on/off valve, filling said water storage chamber and placing said controller in a predetermined location adjacent the pool with said outlet above the pool and said float in a position whereby it may move said on/off valve to the off position upon the water in the pool reaching a predetermined level.

9. A portable container according to claim 2, wherein said container is a blow moulded container.

10. A portable container according to claim 3, wherein said container is a blow moulded container.

* * * * *